(12) United States Patent
Pohl et al.

(10) Patent No.: US 12,378,956 B2
(45) Date of Patent: Aug. 5, 2025

(54) COMPONENT WITH MOULDED-ON SEAL

(71) Applicant: Valeo Powertrain GmbH, Ebern (DE)

(72) Inventors: Thomas Pohl, Ebern (DE); Freddy Steinmetz, Ebern (DE)

(73) Assignee: Valeo Powertrain GmbH, Ebern (DE)

( * ) Notice: Subject to any disclaimer, the term of this patent is extended or adjusted under 35 U.S.C. 154(b) by 181 days.

(21) Appl. No.: 17/889,447

(22) Filed: Aug. 17, 2022

(65) Prior Publication Data

US 2023/0083923 A1    Mar. 16, 2023

(30) Foreign Application Priority Data

Sep. 10, 2021  (DE) ...................... 10 2021 123 469.7

(51) Int. Cl.
| | |
|---|---|
| *F04B 53/16* | (2006.01) |
| *B29C 45/26* | (2006.01) |
| *F16J 15/00* | (2006.01) |
| B29C 45/14 | (2006.01) |
| B29L 31/00 | (2006.01) |

(52) U.S. Cl.
CPC .......... *F04B 53/16* (2013.01); *B29C 45/2669* (2013.01); *F16J 15/002* (2013.01); *B29C 2045/14459* (2013.01); *B29L 2031/7496* (2013.01)

(58) Field of Classification Search
CPC .......... F16J 15/002; F16J 15/02; F16J 15/021; F04B 53/16; B29C 45/2669; B29C 2045/14459; B29L 2031/7496
See application file for complete search history.

(56) References Cited

U.S. PATENT DOCUMENTS

2006/0269818 A1* 11/2006 Inoue .................... H01M 8/026
429/514

FOREIGN PATENT DOCUMENTS

| | | |
|---|---|---|
| DE | 199 49 471 C1 | 5/2001 |
| DE | 10 2009 049 724 A1 | 4/2011 |
| EP | 3683476 A1 * | 7/2020 |

OTHER PUBLICATIONS

English Translation of EP3683476 (Year: 2006).*
German Search report issued Apr. 21, 2022 in German Application 10 2021 123 469.7 filed on Sep. 10, 2021, 7 pages (with English Translation of Categories of Cited Documents & Written Opinion).
Extended European Search Report issued on Jan. 19, 2023 in European Application No. 22194286.5, 6 pages.

* cited by examiner

*Primary Examiner* — Gilbert Y Lee
(74) *Attorney, Agent, or Firm* — Oblon, McClelland, Maier & Neustadt, L.L.P.

(57) ABSTRACT

A method for manufacturing a component with moulded-on seal, in particular a pump component. The component is laid in an injection-moulding tool, then a sealing material is injected from an injection gate into the injection-moulding tool and fills a cavity on one side of the component. Sufficient sealing material is injected for a part of the sealing material to pass from the cavity, via an overflow channel connected to the cavity, into an overflow chamber which is provided inside the contour of the component. A component can includes the moulded-on seal.

7 Claims, 4 Drawing Sheets

COMPONENT WITH MOULDED-ON SEAL

BACKGROUND OF THE INVENTION

Field of the Invention

The invention concerns a method for manufacturing a component with moulded-on seal, in particular a pump component. The invention furthermore concerns a component which has a moulded-on seal on two mutually opposite end faces.

Description of the Related Art

It is known that the quality of injection-moulded components depends decisively on the geometry of the components themselves and on the process parameters, for example the moulding duration, the mould mass temperature and viscosity, and the pressure applied. With some plastics, in particular elastomer materials, processing is particularly difficult since the material properties depend very greatly on the selected process parameters. Even slight fluctuations in process parameters and/or material quality can lead to the inclusion of gas bubbles in the moulding material, and/or components not being fully moulded.

During overmoulding or when moulding on elements, the insert as a further element in the injection mould further hinders the process. The process must therefore be controlled even more precisely in order to provide high-quality components and avoid rejects.

BRIEF SUMMARY OF THE INVENTION

It is therefore the object of the invention to provide a method with which components with moulded-on elements, in particular seals, can be produced easily and in high quality. In particular, the moulded-on elements should have a consistent and fault-free geometry.

The object is achieved according to the invention by a method for manufacturing a component with moulded-on seal, in particular a pump component, wherein the component is laid in an injection-moulding tool, then a sealing material is injected from an injection gate into the injection-moulding tool and fills a cavity on one side of the component, wherein sufficient sealing material is injected for a part of the sealing material to pass from the cavity, via an overflow channel connected to the cavity, into an overflow chamber which is provided inside the contour of the component.

The overflow chamber offers an additional volume which can receive sealing material and thereby reduce fluctuations in process parameters, for example the material flow rate and/or pressure inside the cavity. The particular arrangement of the overflow chamber inside the contour of the component means that practically no useful installation space is lost.

The term "cavity" here designates the regions inside the injection-moulding tool which serve for forming the desired seal geometry. Therefore the overflow chamber, although connected to the cavity, is a portion functionally separate therefrom even when (partially) filled with moulding material during the injection-moulding process.

In particular, it is conceivable that the components to be overmoulded are themselves plastic injection mouldings, which vary slightly from part to part for production reasons. If two different components are laid in the same injection-moulding tool, the cavity volumes which form between the components and the injection-moulding tool may differ slightly. Such volume differences can however be compensated by the method according to the invention. Accordingly, component quality is improved and fewer rejects are produced.

Furthermore, by means of the method according to the invention, the necessary processing time can be reduced. The injection pressure and injection speed can be maintained until the cavity is completely filled and liquid plastic enters the overflow chamber. It is not necessary to reduce the injection pressure before the cavity is completely filled, and then wait until liquid plastic has become evenly distributed in the cavity.

In a preferred embodiment of the method, starting from the injection gate, the sealing material fills a cavity on an end face of the component and, through overspill channels arranged in the component, fills the cavity connected to the overflow channel, wherein the cavity connected to the overflow channel is arranged on an end face of the component facing away from the injection gate. In this way, using the method, one-piece seals can be produced which have seal portions on opposite component ends and are particularly suitable for use in pump housings. In addition, the arrangement of the overflow chamber on an end face of the component opposite the injection gate allows compensation for pressure fluctuations, even in regions of the injection-moulding tool far removed from the injection gate and in which there is typically a greater tendency to moulding defects because of the pressure fall starting from the gate.

According to a further embodiment of the invention, the overflow channel is arranged in the component. In particular, it is conceivable that, during injection moulding, the overflow channel fills with sealing material and thereby a finished moulding with smooth surface is produced. This avoids deformations and/or webs on the surface.

Alternatively, the overflow channel may be provided in the injection-moulding tool. This guarantees that, on insertion of different components to be overmoulded, the overflow channel always has the same geometry and hence also functionality.

In one embodiment of the method, it is provided that sealing material flowing into the overflow chamber encloses and compresses a gas present in the overflow chamber. The compressed gas causes a counter-pressure on the sealing material. Accordingly, the pressure drops less greatly between the injection gate and the overflow chamber. This ensures that the cavities are completely filled even in regions far removed from the injection gate, which leads to a further reduction in rejects.

The object is also achieved according to the invention by a component with moulded-on seal, in particular a pump component, having an overflow chamber which is formed inside a contour of the component and is provided for receiving part of the injected sealing material during the injection moulding of the seal. The advantages which were discussed for the method evidently also apply to the component.

In one possible embodiment, the seal comprises two seal portions which are arranged on two mutually opposite end faces of the component, wherein the two seal portions are integrally connected together by means of at least one overspill channel, and wherein one of the seal portions has an injection gate and the overflow chamber is assigned to the other seal portion. Seals formed in this way are particularly suitable for use in pump housings since they reduce the installation complexity of attachments, for example covers, and leads to greater robustness in comparison with systems having two individual seals.

In a preferred embodiment, it is provided that the overflow chamber is connected via an overflow channel to the region in which the seal is arranged. Thus surplus sealing material from the region of the seal can enter the overflow chamber directly. Particularly preferably, this arrangement allows a laminar inflow of sealing material into the overflow chamber, reducing pressure fluctuations.

It is furthermore conceivable that the overflow chamber, with the exception of the connection to the overflow channel, is gas-tight. This allows a gas to be enclosed in the overflow chamber and compressed by inflowing sealing material. The resulting counter-pressure may, as already described for the method according to the invention, be used to achieve more homogeneous components and reduce rejects.

A further aspect of the invention provides that the overflow chamber is arranged between the two end faces of the component. This arrangement is particularly space-saving.

It may furthermore be provided that the overflow chamber has a curved cross-section. Curved in this context means that there are no sharp corners and/or edges. In particular, it is conceivable that a cross-section of the overflow chamber is round and/or spiral. This ensures that the plastic mass flows into the overflow chamber in laminar fashion and no turbulent eddies occur which could result in fluctuations of cavity pressure.

In a further preferred embodiment variant of the invention, the overflow chamber is very much longer in an extent direction from the one end face to the other end face of the component than in the cross-sectional direction. The overflow chamber can therefore be closed gas-tightly even with a small quantity of inflowing sealing material. Furthermore, this configuration takes up little space which may be useful for the overspill channels. In particular, it is conceivable that the overflow chamber and the overspill channels are arranged in parallel, since this leads to the least competition for installation space.

It may furthermore be provided that the two seal portions are annular and the overflow chamber is arranged radially outside the seal portions. With this arrangement, no space lying inside the seal portions and hence usable as a pump volume is lost.

In order to fix introduced sealing material in the overflow chamber, this may be equipped with a protrusion. In particular, it is conceivable that the protrusion is arranged transversely to a flow direction of the sealing material flowing into the overflow chamber. The protrusion increases a contact area and, by association, an adhesion between the overflow chamber walls and the sealing material. The sealing material is mechanically anchored and cannot fall out of the overflow chamber, e.g. during installation.

BRIEF DESCRIPTION OF THE SEVERAL VIEWS OF THE DRAWINGS

Further features and advantages of the invention will emerge from the following description and from the appended drawings, to which reference is made. In the drawings.

DETAILED DESCRIPTION OF THE INVENTION

Figure 1:
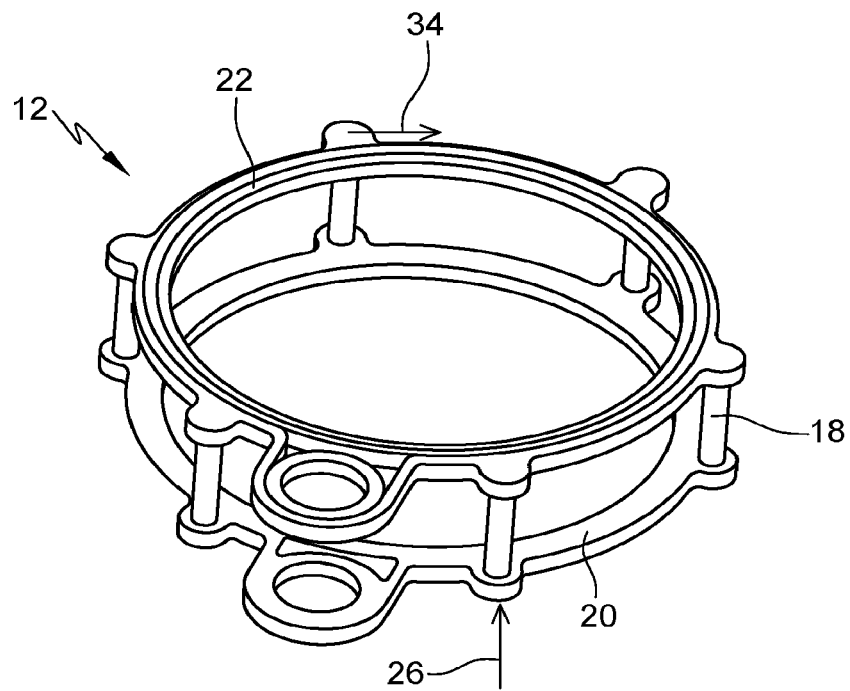
FIG. 1 shows a perspective view of a one-piece seal with two seal portions for a pump component.
Figure 2:
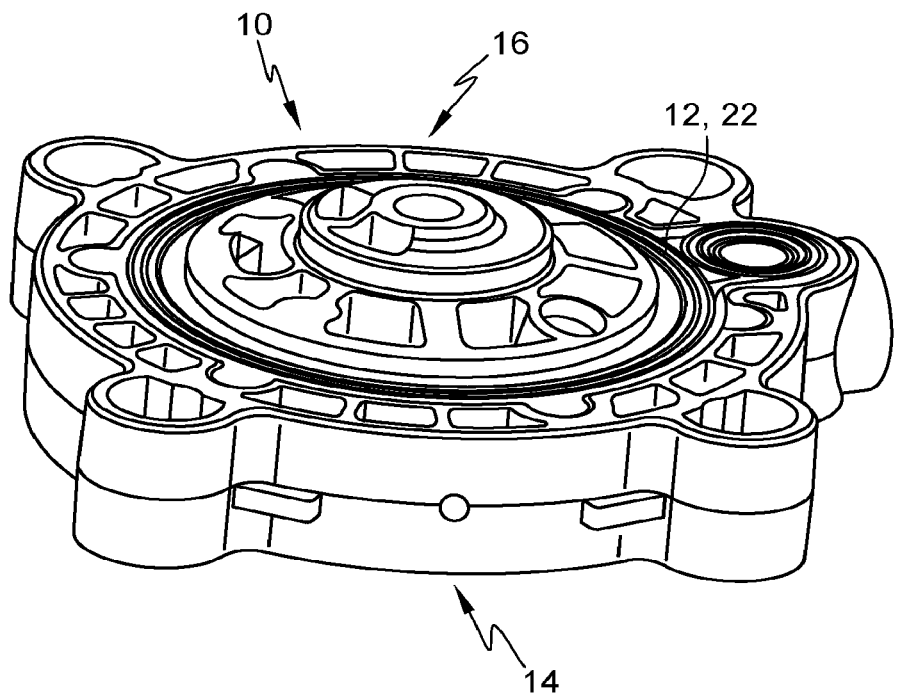
FIG. 2 shows a perspective view of a pump component with an integral moulded-on seal.
Figure 3:
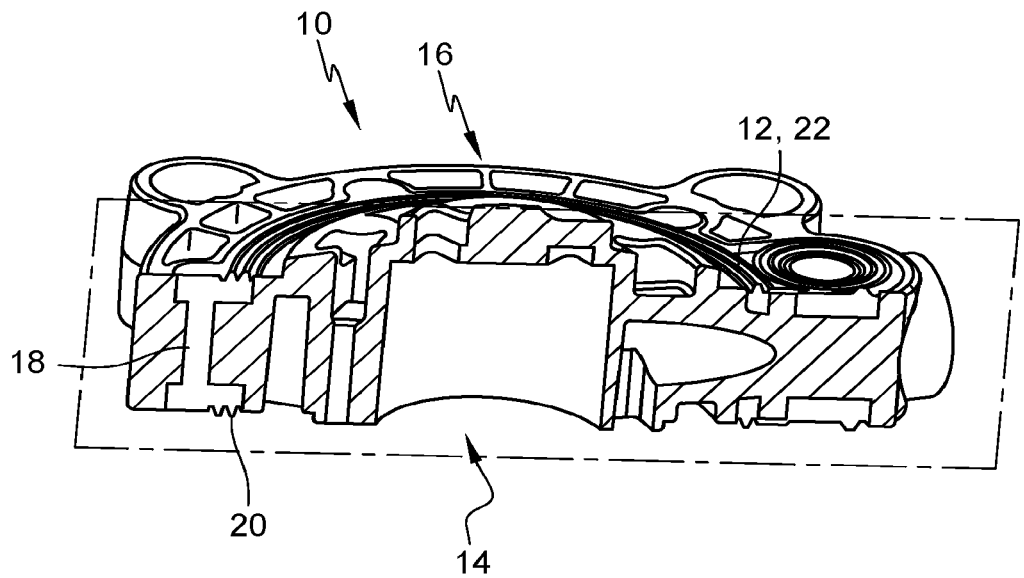
FIG. 3 shows a first sectional view of the pump component from FIG. 2.

FIG. 1 shows a one-piece seal 12 for components 10, in particular pump components, for example a pump housing. The pump is in particular a hydraulic pump for supplying a transmission of an electric or hybrid drive module of a motor vehicle.

The seal 12 is produced by moulding onto or over a pump component 10 and has two annular seal portions 20, 22. The seal portions 20, 22 are arranged spaced apart from one another on an axis and are connected together by several overspill webs 18.

Evidently, the example shown in FIG. 1 should be regarded purely as an example. Embodiments with simpler geometry are also possible, in particular those in which the seal 12 has a single seal portion 20 arranged on one side of the component 10.

In the exemplary embodiment shown in FIG. 1, the two seals portions 20, 22 are provided for sealing the pump component 10 against a housing cover and/or other attachments on two opposing end faces 14, 16.

The integral design of the seal 12 means that the component 10 can be mounted more easily than conventional two-piece systems, which ensures a particularly high component reliability.

FIGS. 2 to 6 show various views of a pump component 10 with such an integral moulded-on seal 12.

In the exemplary embodiment, the pump component 10 is an injection moulding produced from a thermoplastic material. The seal 12 is also an injection moulding and may for example be made of rubber, particular fluorocarbon rubber.

The seal 12 and the pump component 10 are designed such that the two seal portions 20, 22 are arranged on two mutually opposite end faces 14, 16 of the pump component 10.

In this exemplary embodiment, the two seal portions 20, 22 are connected via six overspill channels 18 which run through the pump component 10. The overspill channels 18 are evenly spaced apart from one another over an edge region of the pump component 10.

One of the seal portions 20 has an injection gate 26.

The opposite seal portion 22 is connected to an overflow chamber 34 via an overflow channel 32. The overflow channel is arranged inside a contour of the component 10 and is provided to receive surplus sealing material during injection moulding of the seal 12, and thereby compensate for fluctuations of process parameters, for example the cavity pressure.

Evidently, in addition to the example described, embodiments with several overflow chambers 34 are also conceivable.

Figure 4:
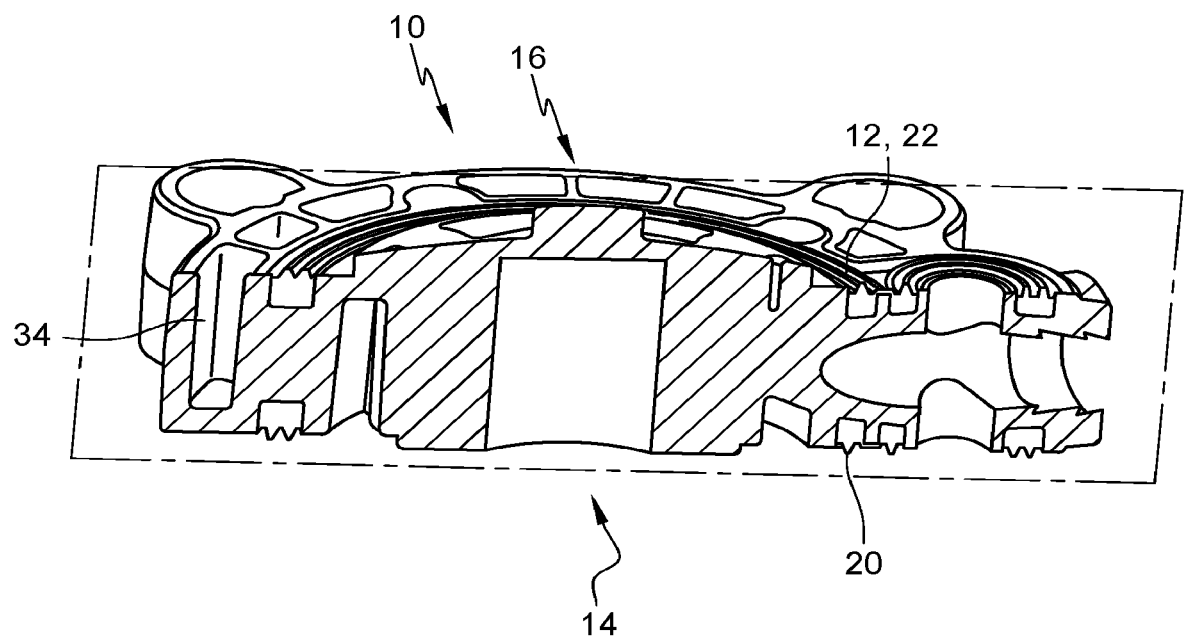
FIG. 4 shows a second sectional view of the pump component from FIG. 2.
Figure 5:
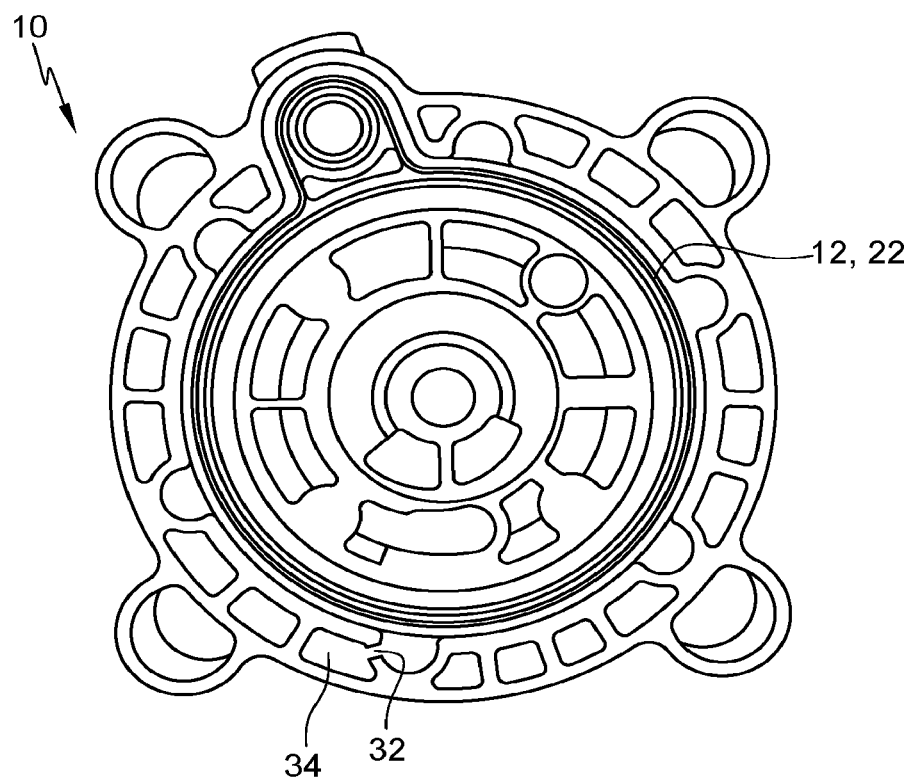
FIG. 5 shows an end face view of the pump component from FIG. 2.
Figure 6:
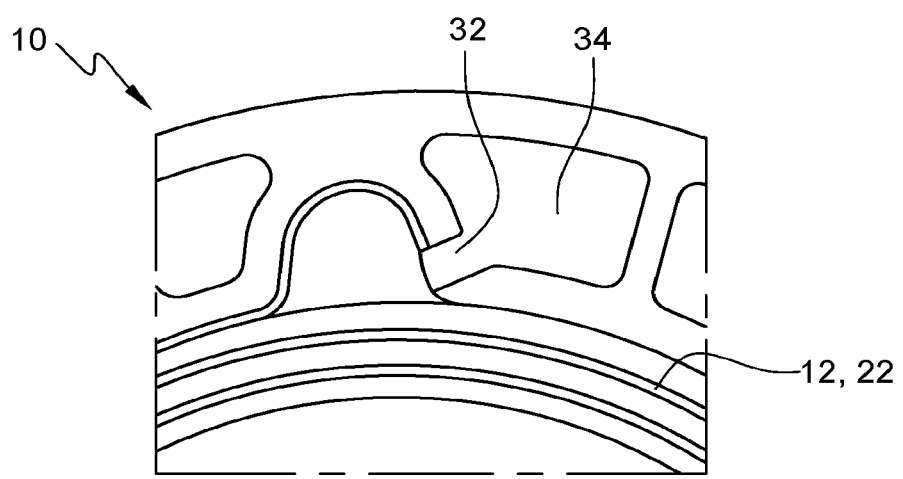
FIG. 6 shows an extract of the pump component from FIG. 2 which has a filled overflow chamber and an overflow channel.

FIGS. 4 to 6 show various views of an exemplary arrangement of the overflow chamber 34 in the component 10. The overflow chamber 34 extends between the two end faces 14, 16 of the component. In this extent direction, the overflow chamber 34 is very much longer than in its cross-sectional direction perpendicular thereto. This very compact arrangement avoids competition for installation space with the overspill channels 18.

The geometry of the overflow chamber 34 is not restricted to the embodiment variants shown in FIGS. 4 to 6. In particular, spirally curved overflow chambers 34 or ones tapering in cross-section are conceivable, for example in order to provide a smaller or larger overflow volume 1 and/or a volume precisely adapted to the process parameters.

Figure 7:
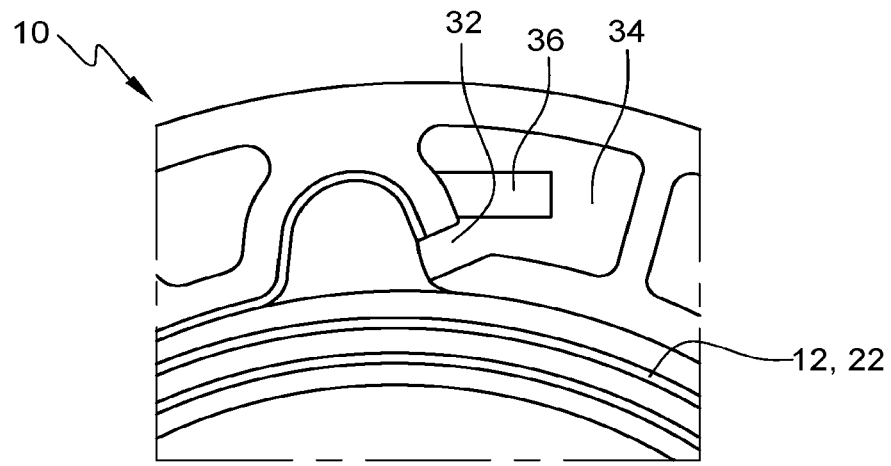
FIG. 7 shows an extract of a pump component which has a filled overflow chamber with a protrusion.

FIG. 7 shows as an example a second embodiment variant of an overflow chamber 34 with a protrusion 36 which is arranged transversely to a flow direction of sealing material flowing into the overflow chamber 34. In this variant, the protrusion 36 reduces the overflow volume and fixes the sealing material.

As evident from FIGS. 4 to 6, the overflow chamber 34 is arranged radially outside the seal portions 20, 22. The volume lying inside the seal 12 accordingly remains untouched and may be used as a working and/or pump volume.

In the exemplary embodiment, the overflow chamber 34 has only one opening which is connected to the overflow channel 32. The walls of the overflow chamber 34 are gas-tight. It is therefore possible to enclose a gas in the overflow chamber 34 during injection-moulding of the seal 12, and build up a counter-pressure on the sealing material flowing into the overflow chamber 12. The counter-pressure may, as described above, have a positive effect on the quality of the seal 12.

For illustration, FIG. 6 shows a view of a filled overflow chamber 34, looking onto the opening, and the overflow channel 32.

Figure 8:
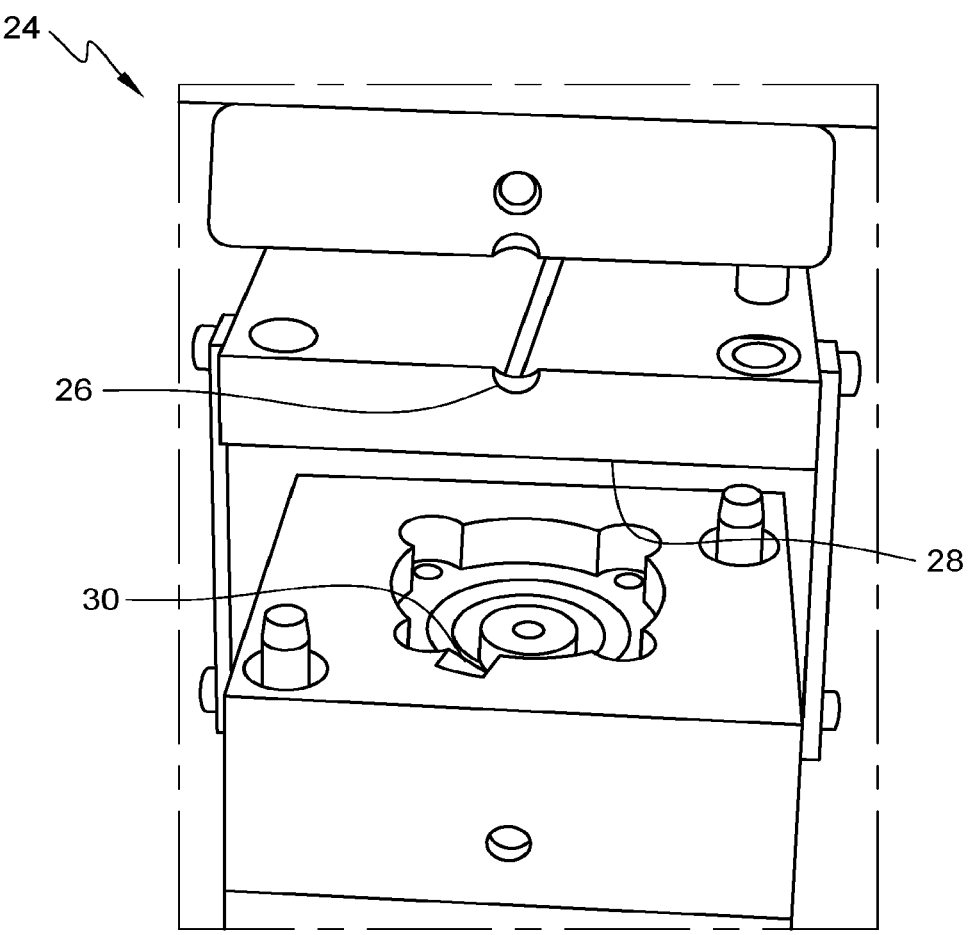
FIG. 8 shows a perspective view of an injection-moulding tool for manufacture of a component with an integral moulded-on seal.

The pump component 10 with moulded-on seal 12 shown in FIGS. 2 to 6 is produced with an exemplary embodiment of a method according to the invention. An injection-moulding tool 24, as shown in FIG. 8, is used here. The method is described in more detail below.

At the start of the method, the pump component 10 is laid in the injection-moulding tool 24. The component 10 is positioned such that between its end faces 14, 16 and the injection-moulding tool 24, cavities 28, 30 are formed in which the two seal portions 20, 22 are moulded.

Evidently, the method according to the invention is not limited to the exemplary embodiment described. In particular, embodiments are also possible in which a component 10 is positioned in an injection-moulding tool 24 such that only a single cavity is formed on one side of the component 10.

In the embodiment variant described, the sealing material is injected into the injection-moulding tool 24 from an injection gate 26.

The sealing material passes from the injection gate 26 into the cavity 28 and fills this. Through the overspill channels 18 in the pump component 10, the sealing material also enters the other cavity 30 on the opposite end face 16 of the component 10 and fills this.

Enough sealing material is injected for part of the sealing material to flow from the latter cavity 30 via the overflow channel 32 into the overflow chamber 34.

In this exemplary embodiment, the overflow channel 32—as shown in FIG. 6—is formed by a depression in the end face 16 of the pump component 10.

Alternatively or additionally, it is also conceivable that the injection-moulding tool 24 is fitted with additional cavities forming overflow channels.

When flowing into the overflow chamber 34, the sealing material encloses gas present in the overflow chamber 34 and compresses this, whereby a counter-pressure is produced which may have a positive effect on the quality of the seal 12.

When the cavities 28, 30 are completely filled with sealing material, said material is cooled. It then sets and forms the seal 12.

In a final step, the injection-moulding tool 24 is opened and the component 10 with moulded-on seal 12 is ejected.

The invention claimed is:

1. A pump component comprising:
   a molded-on seal having first and second seal portions respectively provided on first and second end faces of the pump component, the first and second seal portions being connected to each other via an overspill channel provided in the pump component and extending through an entire thickness of the pump component between the first and second end faces of the pump component along an extent direction of the pump component;
   an overflow chamber which is formed inside a contour of the pump component and is provided for receiving a part of an injected sealing material during injection molding of the seal, an opening of the overflow chamber being provided on the second end face of the pump component and a bottom of the overflow chamber being disposed between the first end face and the second end face of the pump component in the extent direction; and
   an overflow channel provided in the second end face of the pump component and which connects the overflow chamber to the overspill channel in a cross-sectional direction perpendicular to the extent direction.

2. The component according to claim 1, wherein the first seal portion has an injection gate and the overflow chamber is assigned to the second seal portion.

3. The component according to claim 2, wherein a maximum dimension of the overflow chamber in the extent direction is greater than a maximum dimension of the overflow chamber in the cross-sectional direction.

4. The component according to claim 2, wherein the first and second seal portions are annular and the overflow chamber is arranged radially outside the first and second seal portions.

5. The component according to claim 1, wherein the overflow chamber is gas-tight, except for a connection to the overflow channel.

6. The component according to claim 1, wherein the overflow chamber has a curved cross-section.

7. The component according to claim 1, further comprising a protrusion which protrudes into the overflow chamber and is arranged transversely to a flow direction of sealing material flowing into the overflow chamber.

* * * * *